United States Patent Office 3,496,596
Patented Feb. 24, 1970

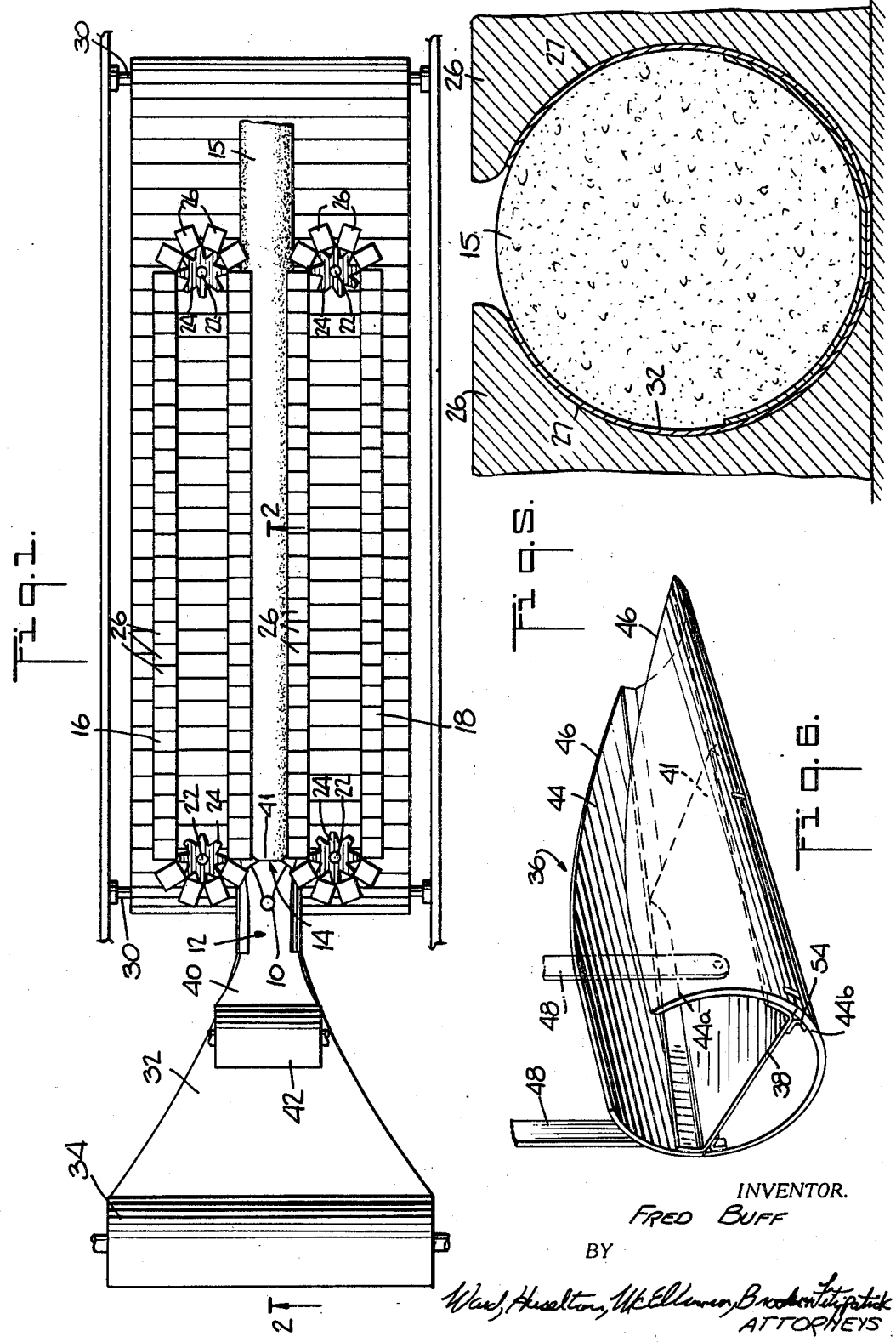

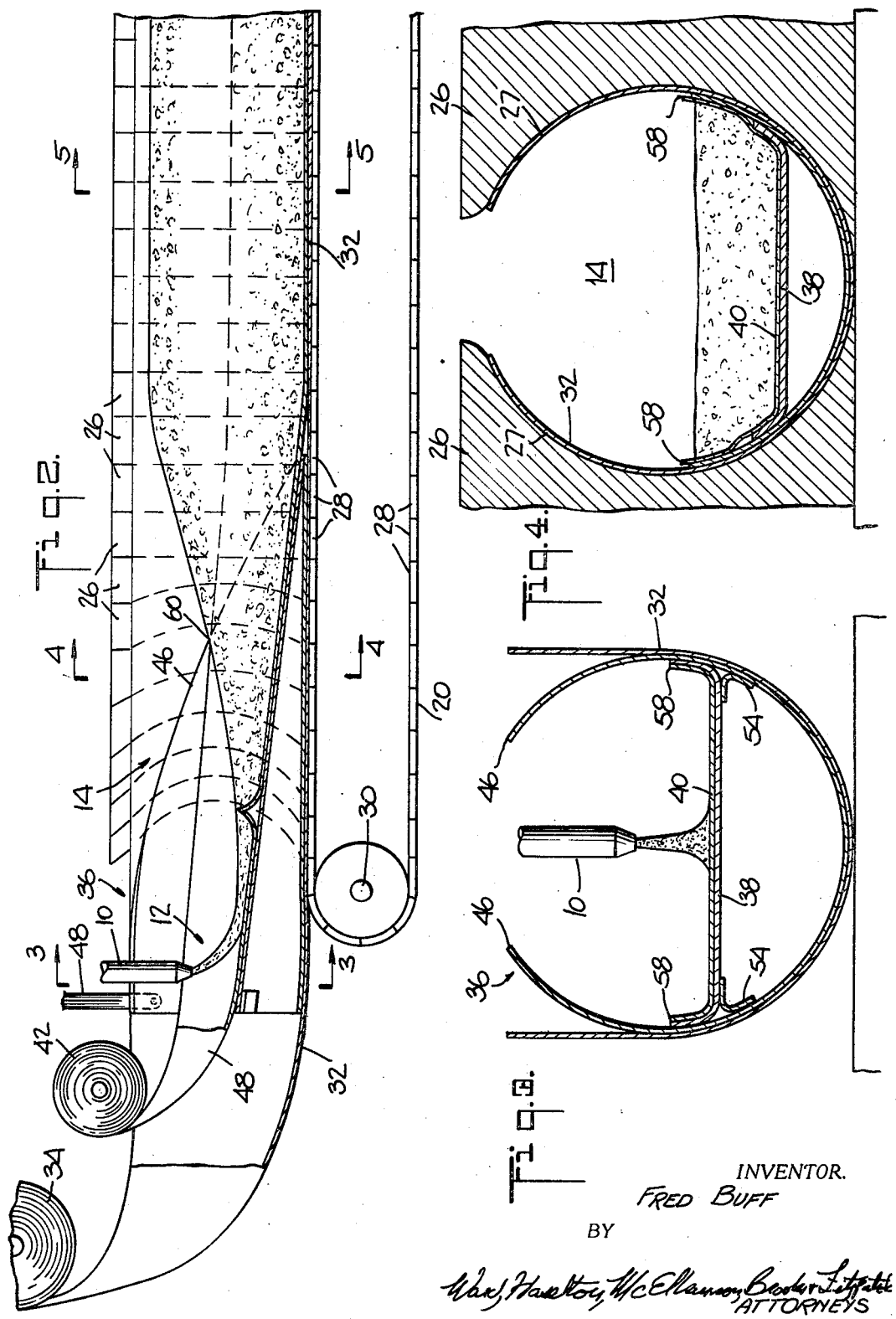

3,496,596
MOLDING OF FOAMED ARTICLES
Fred Buff, Paramus, N.J., assignor to Tenneco Chemicals, Inc., a corporation of New York
Filed Jan. 5, 1968, Ser. No. 695,913
Int. Cl. B29d 27/04
U.S. Cl. 18—4                              12 Claims

ABSTRACT OF THE DISCLOSURE

Continuous molding arrangements whereby a molding web is drawn continuously from a roll passed first over an internal web support and thence into a molding channel, the internal mold support having a pour plate onto which a liquid reaction mixture is poured and which directs the mixture onto the web within the channel.

---

This invention relates to continuous molding operations and more particularly it concerns the lining of the interior of a continuous molding device with a flexible web.

The present invention is especially suited for the molding of elongated elements of continuous, yet large, cross-section. For example, the invention may be used for the production of large diameter cylinders of foamed polyurethane. U.S. Patents 3,281,984 and 3,296,658, assigned the assignee of the present invention, show and describe polyurethane cylinder forming arrangements of the type to which the present invention is suited.

In the aforementioned patents, a plurality of synchronously driven conveyors are arranged in close parallel relationship; and the conveyors are provided with shaped segments which cooperate to define a continuously moving elongated mold channel of a given cross-sectional configuration. Liquid reaction products are transported into the upstream end of the channel; and they rise and solidify therein to form an expanded cellular product which is recovered at the downstream end. The process proceeds continuously and the formed reaction product may be as long as desired. Usually it is severed into discrete lengths for further processing.

The present invention is directed to novel means for supplying a flexible web of sheet material, such as paper, to the upstream end of the molding channel so that it will pass smoothly and continuously down through the channel and act as a liner for the moving internal surfaces of the channel. This web, which may be chemically treated to permit later release from the foamed product, serves to provide a smooth and continuous surface for the mold channel and to mask the gaps between adjacent segments of the conveyors which define the channel.

As the molded cross-sections become wider, greater web widths are required; and accordingly, the problems of handling the transition of the web to the desired mold configuration are multiplied.

The present invention provides a novel web feed arrangement which insures that the web being fed into the molding channel is in proper contour to fully and effectively line the channel. This novel web feed arrangement, moreover, serves to provide substantially complete lateral support on both sides of the web both before and during the rise of the foaming reaction mixture.

The novel web feed arrangement of the present invention comprises an internal web support structure which leads into and which is configured to correspond to the interior of the molding channel. A web supply roll, on which a molding web is coiled, is mounted in advance of the web support structure. The web proceeds from the supply roll and about the exterior of the web support structure and into the moving molding channel.

The web support structure, as illustratively embodied, is constructed with a special pour plate arrangement which provides a surface onto which the liquid reaction mixture is poured. This mixture is actually poured onto a similarly moving pouring web which moves over the pouring surface and thence down toward the main web. The web support structure is configured such that it provides internal support for the main web until the foaming reaction mixture rises above the edges of the pouring web. Beyond this point the pouring web is in direct contact with the main web and the foaming material itself performs the internal web support function.

Various further and more specific objects, features and advantages of the invention will appear from the description given below, taken in connection with the accompanying drawings, illustrating by way of example a preferred form of the invention.

In the drawings:

FIG. 1 is a plan view of a molding apparatus embodying the principles of the present invention;

FIG. 2 is a section view taken along line 2—2 of FIG. 1;

FIG. 3 is a section view taken along line 3—3 of FIG. 2;

FIG. 4 is a section view taken along line 4—4 of FIG. 2;

FIG. 5 is a section view taken along line 5—5 of FIG. 2; and

FIG. 6 is a perspective view of an internal web support forming a portion of the apparatus of FIG. 1.

The molding apparatus shown in FIGS. 1 and 2 serves to produce large diameter cylindrical blocks of cellular polyurethane from a liquid reaction mixture. This liquid reaction mixture is poured continuously from a nozzle 10 down onto a pouring surface 12. It flows down the surface 12 and into a molding channel, indicated generally at 14. During its movement along the molding channel the liquid reaction mixture undergoes a series of reactions whereby it foams and expands, and at the same time it solidifies into a completed block 15 whose cross-sectional configuration is the same as that of the molding channel 14.

The molding channel 14 is formed by a pair of side conveyors 16 and 18, and a bottom conveyor 20. The side conveyors 16 and 18 each comprise a pair of endless loops which extend about vertical axles 22. Star wheels 24 revolve about the axles 22 and serve to support the conveyor loops. Each of the side conveyors 16 and 18 is made up of a plurality of forming blocks 26. These blocks, as can be seen in FIG. 1, are positioned adjacent each other and are hingedly connected together. The blocks 26, as shown in FIGS. 4 and 5, are curved along one surface 27, so that they cooperate to define a partially circular cross section along the channel 14 between the two side conveyors 16 and 18. The bottom conveyor 20 extends under the side conveyors 16 and 18. This conveyor, which is also of the endless loop type, is made up of a plurality of pivotally interconnected flat segments 28, extends about a pair of horizontally extending axles 30. The bottom conveyor 20 serves to provide bottom support for the system.

Each of the conveyors 16, 18 and 20 are driven in synchronism by any suitable means (not shown). This provides a continuous movement of the sides of the channel 14 away from the nozzle 10.

The channel 14 is lined with a molding web 32 which, as shown in FIGS. 4 and 5, lies against the facing surfaces of the blocks 26 on the two side conveyors 16 and 18. This web, moreover, moves along the channel 14 along with the conveyors. The molding web 32 may be of sheet plastic or paper which is specially treated to prevent adhesion with the completed foamed polyurethane product. This web, in addition to preventing the foamed product from sticking to the mold blocks 26, also serves to provide a smooth continuous surface for foaming the molded product, so that it will be relatively free from surface defects.

The molding web 32 is withdrawn continuously from a molding web supply roll 34 located upstream of the pouring nozzle 10. The web 32 passes from the roll 34 and around an internal web support 36. The internal web support 36 then guides the web into the molding channel 14 and up against the mold blocks 26.

The pouring surface 12 is formed by means of a generally flat, downwardly slated pour plate 38 located within the terminal web support 36, and a pouring web 40 which moves along over the pour plate 38. The pour plate 38 is formed with a weir configuration 41 downstream of the nozzle 10. This weir serves to control the flow of liquid reactants so as to optimize the conditions under which foaming and curing take place. The pouring web 40, which is about one-third the width of the molding web 32, is withdrawn continuously from a pouring web supply roll 42 located between the molding web supply roll 34 and the pouring nozzle 10.

The internal web support 36 is best shown in the perspective view of FIG. 6. As can be seen, it comprises a partially closed cylindrical shell 44, having longitudinal edges 46 which tape downwardly in the downstream direction. As shown in FIG. 3, the plate 38 extends horizontally across the interior of the shell 44 at a location about halfway up the shell at its upstream end. The pour plate extends forwardly from this point in a generally downward direction so that it follows the general downward contour of the tapered shell edges 46. At its downstream end the pour plate merges with the downstream end of the shell. The internal web support 36 is suspended from above by means of a pair of braces 48.

As shown in FIG. 2, the upstream end of the internal web support 36 is located between the nozzle 10 and the pouring web supply roll 42. At its downstream end, the internal web support extends into the mold channel 14 between the side conveyors 16 and 18.

In operation of the above-described system, the side and bottom conveyors 16, 18 and 20 move in synchronism, while the molding web 32 is drawn from its supply roll 34 and is moved along on the bottom conveyor 20. The web 32 passes around the shell 44 of the internal web support 36 and is formed by the support into a generally cylindrical configuration. It is maintained in this configuration by the web support 36 as it enters into the molding channel 14 between the side conveyors 16 and 18.

At the same time, the pouring web 40 is drawn from its supply roll 42 and passes down over the pour plate 38. As shown in FIG. 3, the pouring web 40 is only slightly wider than the diameter of the outer shell 44. Accordingly, its edges are slightly upturned. At this point the liquid reaction mixture is released onto the pouring web 40 from the pouring nozzle 10.

As the liquid reaction mixture moves along with the web 40 over the pour plate 38, it moves downwardly relative to the outer shell 44 of the internal web support 36. Because of this the effective width of the pour plate 38 is reduced and the edges of the web 40 begin to move in a relative upward direction along the inside surfaces of the shell 44 as depicted in FIGS. 3, 4 and 5. The liquid reaction mixture begins to foam and rise during this time, however, and its rate of rise exceeds the relative upward movement of the edges of the pouring web 40. Eventually, the rising foam will rise above the edges of the pouring web. At this point, however, the tapered edges 46 of the shell 44 are low enough to permit the rising foam to come into direct contact with the molding web 32. The molding web now continues to be supported in cylindrical configuration. On the one side it is supported by the surface 27 of the side conveyor mold blocks 26; and on the other side it is supported in part by the outer shell 44 of the internal web support 36 and in further part by the rising foam. Eventually the outer shell 44 tapers to a termination and the entire interior of the molding web 32 is supported by the foamed material. The pouring web 40, of course, remains in direct contact with the foamed product as a layer of insignificant thickness. The pouring web 40, like the molding web 32, may also be of sheet plastic or paper treated with a release agent which allows it to be stripped from the finished product upon completion of the molding operation.

It will be appreciated that the system herein described provides a simple yet effective arrangement for contouring a molding web so that it can be used to line a conveyor type molding channel of large cross-section. At the same time the system is readily adjustable to accommodate different reaction characteristics of the reaction mixture or different ambient conditions. Thus the entire internal web support 36 may be moved up or down or tilted on the braces 48. The pour plate 38 may be adjusted by means of brackets 54 (FIG. 3) to be moved up or down with respect to the outer shell 44; and the portions of the outer shell 44 above and below the pour plate (i.e., 44a and 44b, FIG. 6) may be separately moved back and forth in the longitudinal direction to optimize operating conditions. In the case of the lower portion of the shell 44a, it may be desired to begin the cylindrical contour of the molding web well in advance of the molding channel 14 so as to minimize wrinkles. Thus the lower half of the shell could be moved rearwardly and secured by means of fasteners 56 at any desired position. In the case of the upper portion of the shell 44b, it may be desired to bring the tapered edges 46 to a position where they recede below the edges of the pouring web 40 just as the foaming reactants rise above the edges of the pouring web. This may be achieved also by moving the upper portion of the outer shell 44 longitudinally so that, as shown in FIG. 2, the line of the tapered edges 46 of the shell, intersects a line 58 representing the edges of the pouring web 40 and a further line 60 representing the upper surface of the rising foam material at substantially the same location. This will insure substantially complete support at all times for both webs while avoiding any contact of the rising foam with the web support elements themselves.

Although a certain specific embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for use in the production of elongated elements of foamed cellular material from a liquid reaction mixture, said apparatus comprising means defining an elongated molding channel of given cross-sectional configuration, an internal web support of substantially the same cross-sectional configuration mounted at one end of said molding channel and projecting into said channel, means for causing a molding web to pass over said internal web support and along through said channel, and means for depositing said liquid reaction mixture into said web at a location in the vicinity of said one end of said channel.

2. Apparatus as in claim 1 wherein said internal web support is open along its upper portion and wherein said means for depositing said liquid reaction mixture includes a flat pour plate located within said internal web support and slanted downwardly toward the bottom of the end said internal web support which projects into said channel.

3. Apparatus as in claim 2 wherein said means for depositing said liquid reaction mixture further includes means for moving a pour web over said pour plate.

4. Apparatus as in claim 1 wherein said internal web support is of generally tubular shell-like construction and is open along its upper portion.

5. Apparatus as in claim 4 wherein the open edges of said web support are tapered down toward the bottom thereof in the direction of the end of said web support which projects into said channel.

6. Apparatus as in claim 1 wherein said elongated molding channel comprises a plurality of conveyors having facing surfaces which cooperate to form said given cross-sectional configuration.

7. A web forming and pouring device for use in the production of elongated elements of foamed cellular material from a liquid reaction mixture, said device comprising an elongated outer shell which as it extends horizontally has a contoured lower portion and an open upper portion, a flat pour plate extending across the interior of said outer shell and secured to the sides thereof at one end, said pour plate slanting downwardly to merge with the bottom of said shell at its other end.

8. A device as in claim 7 wherein the portions of said shell above and below said pour plate are relatively adjustable in the longitudinal direction.

9. A device as in claim 7 wherein said pour plate is adjustably positionable within said shell.

10. A device as in claim 7 wherein said contoured lower portion of said shell is generally cylindrical.

11. A device as in claim 7 wherein the edges of the open upper portion of said shell taper down toward the bottom of said shell at its other end.

12. In a continuous molding apparatus the combination of elongated movable conveyor means configured to define a continuously moving molding channel of given cross-sectional configuration, means for continuously supplying an elongated flexible web at the upstream end of said molding channel to line the interior thereof, said means comprising a web sunpport member leading into said channel and having an external surface configuration corresponding to substantially the entire interior of said channel, whereby a flexible web in passing around said support member and into said channel will be brought smoothly and fully into conformity with the interior of said channel.

References Cited

UNITED STATES PATENTS

| 2,141,405 | 12/1938 | Randall. |
|-----------|---------|----------|
| 2,668,987 | 2/1954  | Harris et al. |
| 2,898,626 | 8/1959  | Alderfer et al. |
| 2,921,346 | 1/1960  | Fischer. |
| 3,011,218 | 12/1961 | Mittan. |
| 3,020,587 | 2/1962  | Alderfer et al. |
| 3,296,658 | 1/1967  | Buff et al. |
| 3,345,685 | 10/1967 | Tigrett et al. |

WILLIAM J. STEPHENSON, Primary Examiner